United States Patent [19]

Elter et al.

[11] Patent Number: 4,504,439

[45] Date of Patent: Mar. 12, 1985

[54] GAS COOLED NUCLEAR REACTOR

[75] Inventors: Claus Elter, Bad Durkheim; Karl U. Schneider, Betzdorf; Josef Schöning, Hambrücken; Heinrich Stach, Ilvesheim; Wilfried Stracke, Oftersheim, all of Fed. Rep. of Germany

[73] Assignee: Hochtemperatur-Reaktorbau GmbH, Cologne, Fed. Rep. of Germany

[21] Appl. No.: 292,801

[22] Filed: Aug. 14, 1981

[30] Foreign Application Priority Data

Aug. 14, 1980 [DE] Fed. Rep. of Germany ....... 3030697

[51] Int. Cl.³ .......................... G21C 9/00; G21D 1/00
[52] U.S. Cl. ..................................... 376/391; 376/389; 376/283; 376/277; 376/402; 165/32
[58] Field of Search ............ 165/139, 32, 34, 39, 165/40; 376/283, 277, 391, 402, 407, 392, 282, 298, 331

[56] References Cited

U.S. PATENT DOCUMENTS

| 3,202,584 | 8/1965 | Bogaardt et al. | 376/407 |
| 3,309,282 | 3/1967 | Maldague | 376/402 |
| 3,392,087 | 7/1968 | Braun et al. | 376/402 |
| 3,425,907 | 2/1969 | Bonsel et al. | 376/407 |
| 4,036,020 | 7/1977 | Bagley | 376/392 |
| 4,220,200 | 9/1980 | Weber | 376/391 |
| 4,252,611 | 2/1981 | Mizumachi et al. | 376/283 |

FOREIGN PATENT DOCUMENTS

| 1564558 | 2/1970 | Fed. Rep. of Germany | 376/282 |
| 2330123 | 5/1977 | France | 376/282 |
| 772058 | 4/1957 | United Kingdom | 165/139 |
| 843871 | 8/1960 | United Kingdom | 376/331 |
| 895774 | 5/1962 | United Kingdom | 376/331 |

Primary Examiner—Harvey E. Behrend
Attorney, Agent, or Firm—Schwartz, Jeffery, Schwaab, Mack, Blumenthal & Koch

[57] ABSTRACT

It is desirable to being able to vary the temperature of a loop exposed to a flow of hot gases in gas cooled nuclear reactor installations without thereby affecting the gas temperature in the other loops. It should be possible in an extreme case to take the affected loop out of service. This is achieved by arranging under the heat absorbing components in the hot gas channel a means for mixing gas connected with a cold gas line.

12 Claims, 5 Drawing Figures

GAS COOLED NUCLEAR REACTOR

BACKGROUND OF THE INVENTION

1. Field of the Invention

The invention concerns a gas cooled nuclear reactor with several loops connected with the core by means of channels, with heat absorbing components such as heat exchangers, split tubular furnaces or the like being arranged in the loops with hot gas flowing through said components from bottom to top and their external surfaces being exposed to cold gas.

2. Background of the Prior Art

In nuclear reactor installations, the thermal energy produced in the reactor core is transferred by means of a cooling gas medium to heat absorbing components such as heat exchangers, split tubular furnaces, and the like, which may be arranged in circuits or loops. A circuit or loop consists of a shaft or pod in the form of a cylinder arranged vertically in the prestressed concrete pressure vessel connected with the core by means of one or several channels. The circuit or loop houses different reactor components such as the heat exchanger equipment and the like. The cooling medium for example (helium) flows through the core from top to bottom. The cooling medium is conducted through a hot gas channel to the heat absorbing components, wherein it discharges a substantial portion of its thermal energy. It is then passed to the blower and returned to the core, whereby the cooled gas usually flows along the outside of the heat absorbing components. The above-described gas circuit may be supplemented by means of further reactor components, for example, a gas turbine. A plurality of circuits or loops are utilized in the conventional high temperature, gas cooled nuclear reactor.

An essential characteristic of a nuclear reactor installation is that it is designed for a predetermined operational state. Excessive temperatures over extended periods of time or extreme fluctuations around its mean value may result in damage to the reactor installation. Grave problems are associated with the failure of certain heat absorbing components (such as with split tubular furnaces), as access to them is not possible for operational reasons alone (operational at gas temperatures of around 900° C.).

SUMMARY OF THE INVENTION

It is the object of the invention to vary the gas temperature in a circuit of a gas cooled nuclear reactor installation without affecting the temperature of the gas in the other circuits. In an extreme case, it should be possible to take the affected circuit or loop out of service.

This object is attained according to the invention by arranging a means for mixing gases under the heat absorbing component in the hot gas channel. The mixing means is connected with a cold gas conduit.

The invention essentially consists of a mixing means arranged under a heat absorbing component located in the circuit or loop of a gas cooled nuclear reactor. Cold gas is fed into the hot gas flowing into the loop. The mixing means comprises at least one valve and a plurality of tubes projecting into the hot gas channel. The valves have a regulatory function, whereby the temperature of the gas being conducted to the heat absorbing component may be continuously varied within a temperature range of approximately 200° to 900° C. The simplest embodiment of the mixing means would have the potential disadvantage that the gas would not be adequately intermixed. A substantial temperature gradient within the mixed gas would possibly be created. Such a temperature gradient could have a negative effect (deformation) on the heat absorbing component.

An adequate mixing of the hot gas with the cold gas may be obtained by feeding the cold gas by means of distributor heads into the hot gas. The distributor head has a plurality of orifices. The principal axis of each orifice is arranged perpendicularly to the surface of the distributor head. The turbulent flow of the gas flowing through the loop is prevented by inserting an apertured plate at the point of diversion in the hot gas channel. The tubes are arranged in the partition between the hot gas channel and the cold gas channel and may be located according to the invention either above or under the apertured plate. One embodiment is applied advantageously in cooling systems, wherein a reduction of the temperature from approximately 900° to approximately 200° is required. The tubes thereby pass through the apertured plate. The distributor heads are arranged above the apertured plate. In a further possible embodiment the tubes and the distributor heads are arranged under the apertured plate. A very good intermixing of the cold gas with the hot gas may be obtained in keeping with the invention, by causing the gas emerging from the mixing device to flow in a direction opposite to the direction of flow of the hot gas. Gas mixed in this manner displays no appreciable temperature gradient.

The cold gas flows according to the invention through valves controlled by means of a regulator through the tubes into the hot gas channel. During normal operation, the actual temperature coincides with the nominal temperature and the valves are closed. If it is necessary to reduce the temperature of the gas flowing into the loop, the valves are opened slowly, whereby the cold gas flows into the hot gas.

The heat absorbing components are, in a known manner, equipped with thermocouples to measure the temperature of the gas. In case of a failure of a heat absorbing component, it is desirable to reduce its temperature. This may be effected by opening the valves completely. By reducing the temperature, progressive failures of the heat absorbing components may additionally be prevented.

The advantages obtained by the invention consist in particular of being able to vary the temperature of the gas flowing through the loop within a wide range of temperatures without thereby affecting the other loops, and particularly, without affecting the components arranged therein.

BRIEF DESCRIPTION OF THE DRAWINGS

Further advantages and characteristics of the invention will become apparent from the description of the embodiments hereinafter exemplified with reference to the schematic drawings attached hereto.

In the drawing:

FIG. 5 shows a distributor head.

DETAILED DESCRIPTION OF THE EMBODIMENTS

Figure 1:
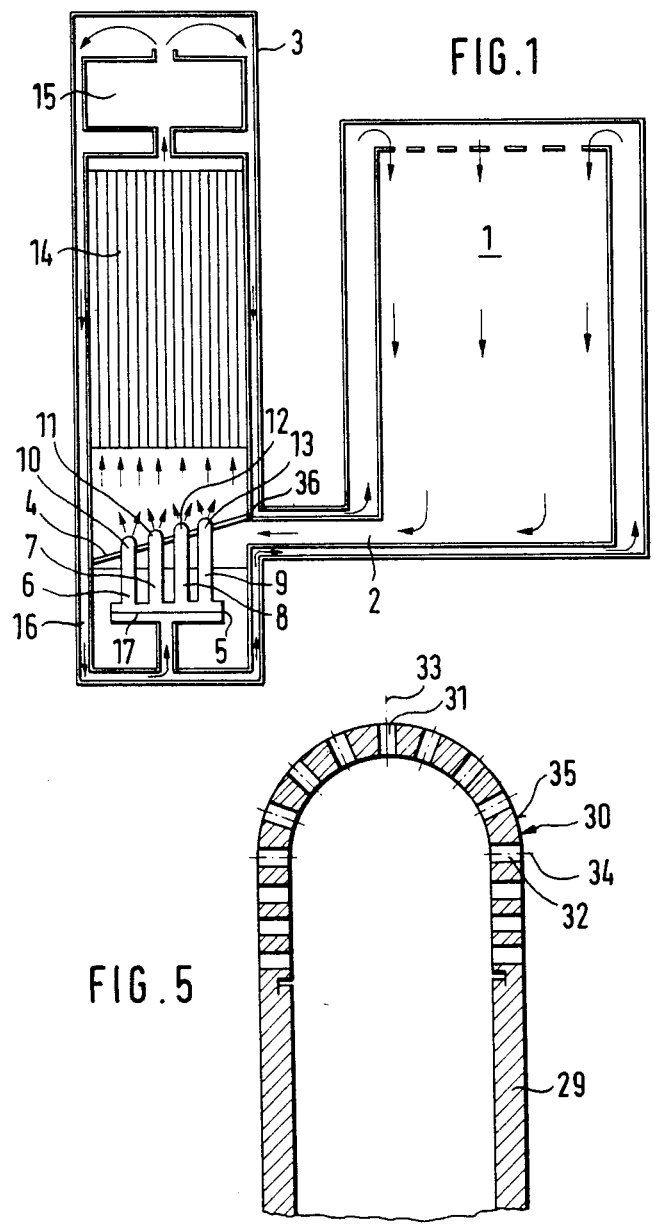
FIG. 1 shows a nuclear reactor installation wherein the core is connected by means of a hot gas channel with a loop having a mixing device according to the invention.

As seen from FIG. 1, the heated gas flows from the core 1 through a hot gas channel 2 into the loop 3. Between the hot gas channel 2 and the loop 3 an apertured plate 4 is arranged, which diverts the hot gas by 90°. In the lower area of the loop 3 a mixing means 5 is arranged according to the invention comprising a plurality of tubes 6, 7, 8, 9 traversing the apertured plate 4 and having their distributor heads 10, 11, 12, 13 above the apertured plate 4. Over the apertured plate 4, the cold gas coming from the mixing device is intermixed with the hot gas. The mixed gas subsequently flows through a heat absorbing component 14, wherefrom it is suctioned by a blower 15 and conducted back through a cold gas line 16 into the core 1. In this embodiment, the gap between the heat absorbing component 14 and the loop 3 is chosen as the cold gas conduit 16. When the valve 17 is opened, the cold gas flows through the mixing device. The flow of the gas is represented by arrows.

Figure 2:
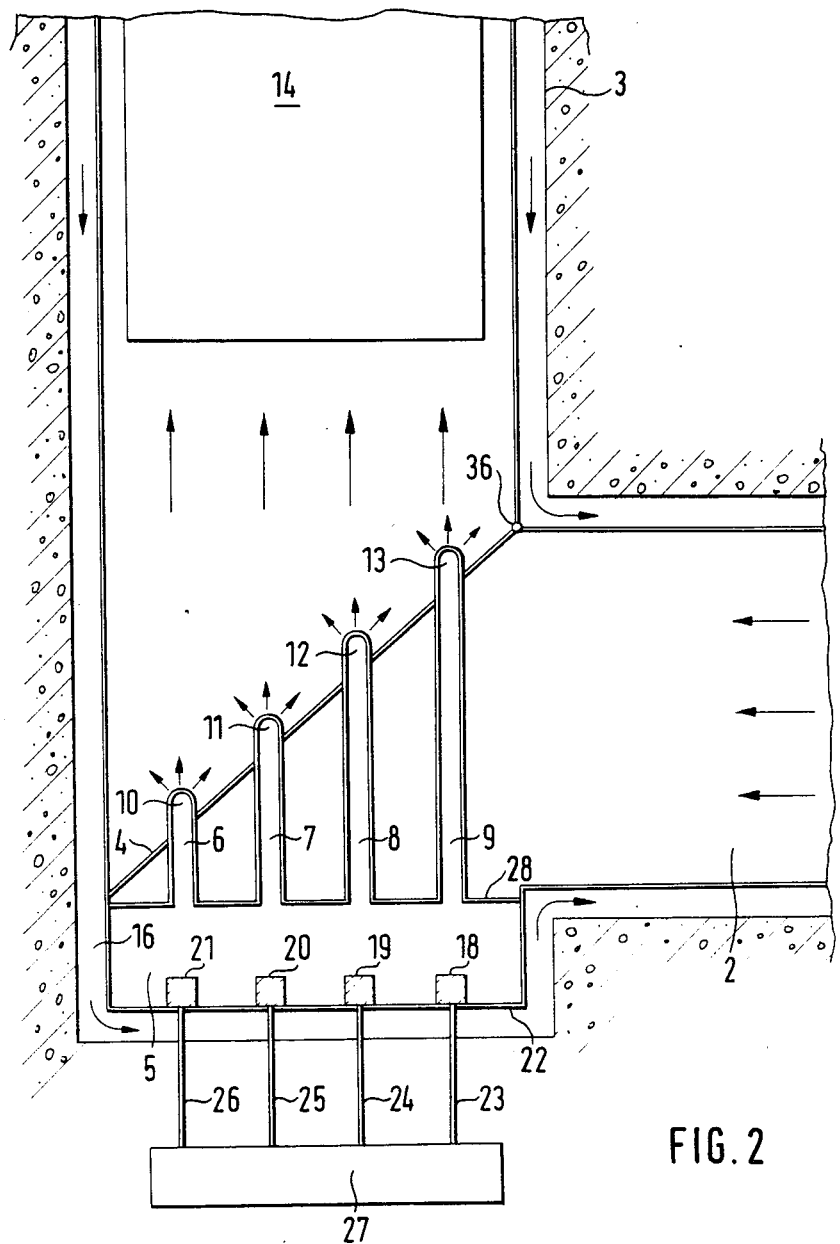
FIG. 2 shows a mixing device according to the invention in the loop.

FIG. 2 shows a mixing means 5 arranged in a loop 3. The valves 18, 19, 20, 21 of the mixing means 5 are arranged in the partition 22 and connected by means of rods 23, 24, 25, 26 with the regulator 27. The tubes 6, 7, 8, 9 are secured in a gas tight manner in the partition 28 and are passing through the apertured plate 4, whereby the distributor heads 10, 11, 12, 13 are arranged above the apertured plate 4. The mixing of the gases takes place above the apertured plate 4.

Figure 3:
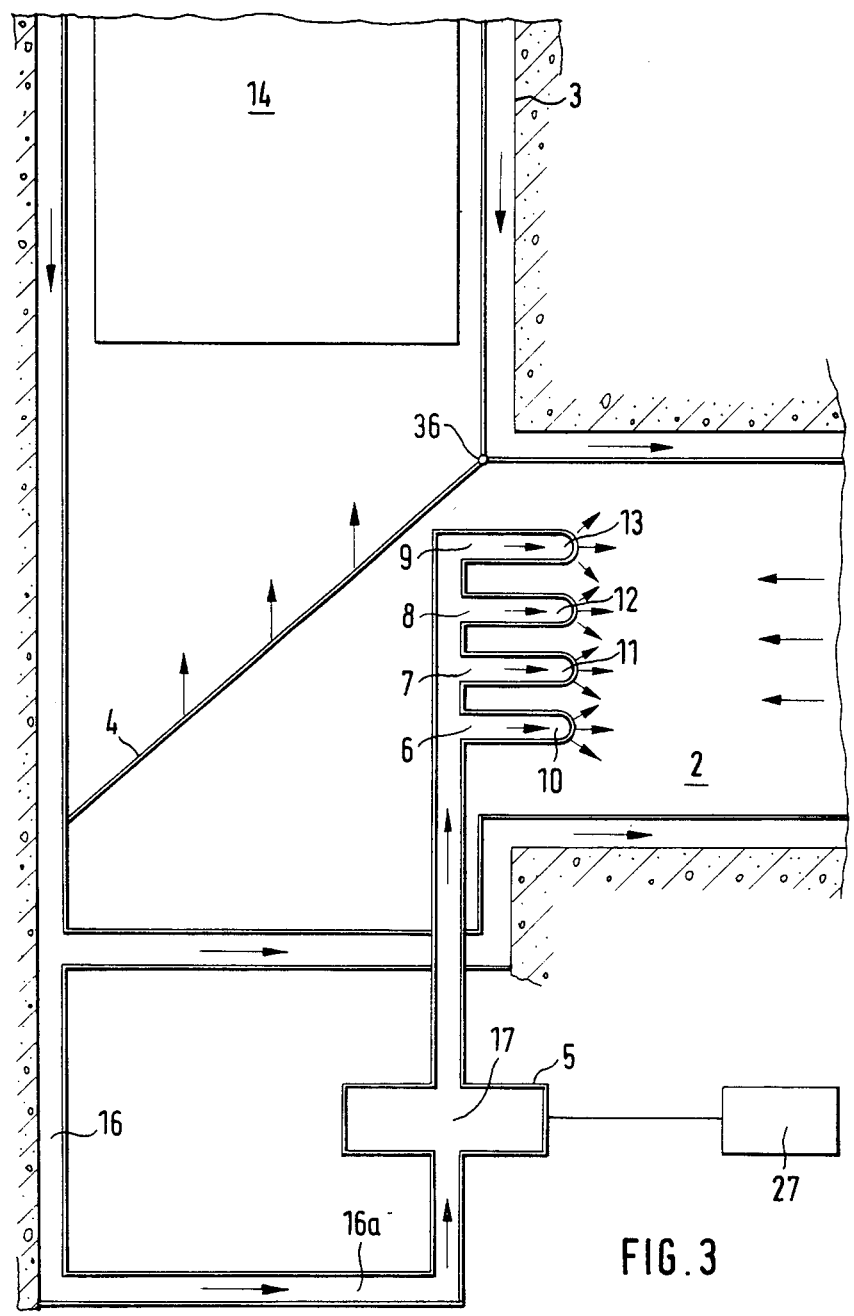
FIG. 3 shows a further embodiment of the mixing device according to the invention.

FIG. 3 shows a mixing means 5 with its tubes arranged under the apertured plate 4 and in the hot gas channel 2. The cold gas flows from a mixing means 5 in a direction opposite to the flow direction of the hot gas. The valve 17 is arranged outside the loop 3, thereby establishing a connection between the cold gas line 16 and the valve 17, through the line 16a.

Figure 4:
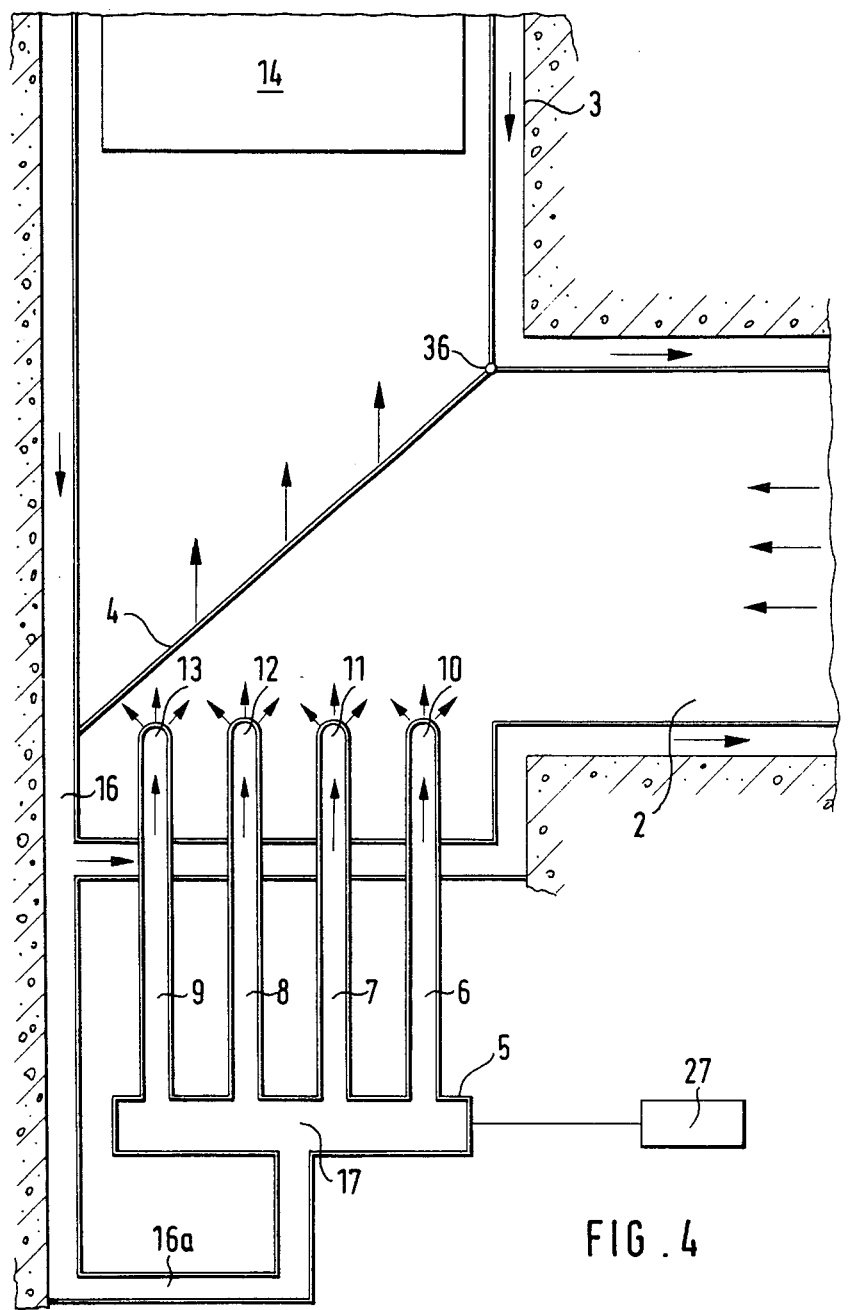
FIG. 4 shows a further embodiment of the mixing device according to the invention.

FIG. 4 shows a mixing means 5 with its distributor heads arranged above the apertured plate 4 and placed orthogonally to the direction of flow of the hot gas. The mixing of the cold gas with the hot gas takes place under the apertured plate 4.

In FIG. 5, a part of the tube 29 is shown with a distributor head 30. The distributor head 30 has several orifices 31, 32 arranged with their principal axes vertically to the surface 35.

We claim:

1. A gas cooled nuclear reactor comprising: a reactor core, at least one closed circuit having a heat absorbing member for receiving cooling gas from said reactor core, a hot gas conduit and a cold gas conduit connecting said heat absorbing member to said reactor core and means for mixing at least a portion of a cooled cooling gas from an outlet side of said heat absorbing member with hot gas downstream of said reactor core and in said hot gas conduit, said means comprising at least one adjustable valve, a conduit connecting said valve with said cold gas conduit and a plurality of tubes projecting into said hot gas conduit, and a distributor head having a plurality of orifices mounted on each of said tubes for dispersing cold gas into said hot gas conduit thereby controlling the temperature of said cooling gas.

2. The gas cooled nuclear reactor of claim 1, wherein said plurality of tubes project into said hot gas conduit against the flow of hot gas in said hot gas conduit.

3. The gas cooled nuclear reactor of claim 2, wherein said hot gas conduits divert the flow of hot gas by means of an apertured plate obliquely positioned in said conduit at a point of diversion of said cooling gas.

4. The gas cooled nuclear reactor of claim 1, wherein said valve is controlled by a regulator.

5. The gas cooled nuclear reactor of claim 14 wherein said heat absorbing member comprises a heat exchanger.

6. The gas cooled nuclear reactor of claim 5, further including an apertured plate which defines a point of diversion of said cooling gas wherein said plurality of tubes project into said hot gas conduit at a point between said reactor core and said apertured plate and at said point of diversion.

7. The gas cooled nuclear reactor of claim 5, further including an apertured plate mounted in said hot gas conduit wherein said plurality of tubes project into said hot gas conduit and through said apertured plate.

8. A process for controlling the temperature in a circuit of a high temperature gas cooled nuclear reactor comprising:

flowing hot gas from a reactor core through a hot gas conduit and then into a heat absorbing member where it is cooled, and then flowing cooled gas through a cold gas conduit and back to a reactor core;

diverting at least a portion of said cooled gas flowing through said cold gas conduit to a gas mixing device;

introducing said diverted cooled gas from said gas mixing device into said hot gas from said reactor through a plurality of tubes extending into said hot gas conduit before entry of the hot gas into said heat absorbing member, said cooled gas being introduced through a plurality of multiple orifice distributor heads respectively mounted on said plurality of tubes, said portion of cooled gas being controlled by an adjustable valve member.

9. The process of claim 8, wherein a plurality of circuits receive hot gas from a reactor core and said adjustable valve member is operable to control the temperature of the cooling gas, said temperature control being independent in each circuit.

10. The process of claim 8 or 9, wherein said introducing comprises introducing said cooled gas in a direction countercurrent to the flow of hot gas in said hot gas conduit.

11. The process of claim 8 or 9, wherein said introducing comprises introducing said cooled gas essentially perpendicular to the flow of hot gas in said hot gas conduit.

12. The process of claim 8 or 9, further including the step of diverting said hot gas flow at a first point upstream of said heat absorbing member wherein said introducing comprises introducing said cooled gas into said hot gas conduit at a second point downstream of said first point.

* * * * *